United States Patent
Langmack et al.

(10) Patent No.: US 10,683,894 B2
(45) Date of Patent: Jun. 16, 2020

(54) AIR BEARING WITH VARIABLE AIR DELIVERY

(71) Applicant: Carl Zeiss Industrielle Messtechnik GmbH, Oberkochen (DE)

(72) Inventors: Malte Langmack, Aalen (DE); Steffen Strauss, Aalen-Waldhausen (DE); Wolfgang Strauss, Staig (DE); Raphael Koch, Neu-Ulm (DE); Christof Poglitsch, Aalen (DE); Holger Hofmann, Aalen (DE); Nikolai Zeller, Jagstzell (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 15/935,052

(22) Filed: Mar. 25, 2018

(65) Prior Publication Data
US 2018/0283451 A1    Oct. 4, 2018

(30) Foreign Application Priority Data
Mar. 31, 2017    (DE) .......................... 10 2017 205 536

(51) Int. Cl.
*F16C 32/06*    (2006.01)
(52) U.S. Cl.
CPC ........ *F16C 32/0618* (2013.01); *F16C 32/067* (2013.01); *F16C 32/0662* (2013.01)
(58) Field of Classification Search
CPC .............. F16C 29/025; F16C 32/0614; F16C 32/0618; F16C 32/0644; F16C 32/0648; F16C 32/0662; F16C 32/067
See application file for complete search history.

(56) References Cited

U.S. PATENT DOCUMENTS

| | | | | |
|---|---|---|---|---|
| 4,504,048 A | * | 3/1985 | Shiba .................... | B23Q 1/385 269/71 |
| 4,630,942 A | * | 12/1986 | Tsumaki ................ | B23Q 1/38 269/73 |

(Continued)

FOREIGN PATENT DOCUMENTS

| CN | 104204717 A | 12/2014 |
|---|---|---|
| CN | 204387109 U | 6/2015 |

(Continued)

OTHER PUBLICATIONS

Office Action dated Jun. 21, 2019 issued in Chinese counterpart application No. 201810295233.7 and English-language translation thereof.

*Primary Examiner* — James Pilkington
(74) *Attorney, Agent, or Firm* — Falk Ewers; Ewers IP Law PLLC

(57) ABSTRACT

An air bearing for movably bearing at least two elements includes a bearing main body with a first air outflow channel and a second air outflow channel. The first air outflow channel is supplied with air via at least one first air delivery device. The second air outflow channel is supplied with air via at least one second air delivery device. A sensor detects at least one of a bearing stroke, a bearing pressure, and a bearing throughflow, and a controller adjusts the supply of the air to at least one of the first air outflow channel and the second air outflow channel in accordance with the at least one of the bearing stroke, the bearing pressure, and the bearing throughflow.

20 Claims, 2 Drawing Sheets

(56) References Cited

U.S. PATENT DOCUMENTS

| | | | |
|---|---|---|---|
| 9,671,210 B2 | 6/2017 | Sagemueller et al. | |
| 2005/0008269 A1* | 1/2005 | Akutsu | F16C 29/025 384/12 |
| 2016/0115993 A1* | 4/2016 | Tada | F16C 29/025 384/12 |
| 2018/0066704 A1 | 3/2018 | Engel | |

FOREIGN PATENT DOCUMENTS

| | | |
|---|---|---|
| CN | 205918760 U | 2/2017 |
| DE | 10229823 A1 | 1/2004 |
| DE | 102005050108 A1 | 4/2007 |
| DE | 102015106831 A1 | 3/2016 |

* cited by examiner

AIR BEARING WITH VARIABLE AIR DELIVERY

CROSS REFERENCE TO RELATED APPLICATIONS

This application claims priority to German patent application DE 10 2017 205 536.7, filed Mar. 31, 2017, the entire content of which is incorporated herein by reference.

TECHNICAL FIELD

The invention relates to an air bearing, in particular for a coordinate measuring machine, and to a coordinate measuring machine.

BACKGROUND

Various fluid pressure bearings for guiding machine tools or measuring machines, for example coordinate measuring machines for measuring workpieces, are known from the related art. During guiding with an air bearing, mutually movable elements, for example two components for moving a sensor of the coordinate measuring machine in three-dimensional space, are mounted in such a way as to be separate from each other by an air gap. Aerostatic bearings are known, in which the air gap is formed by delivery of air into the air bearing.

Such solutions permit exact measurement results in the measurement of the workpiece. Air bearings can facilitate high-precision and ultra-precision guiding by an approximate frictional freedom and a high degree of stiffness. Air bearings can be configured to compensate for short periodic or locally occurring guidance errors, such that more homogeneous operation can be achieved compared to other bearing types, for example roller bearings.

In principle, various types of air bearings are known which differ in terms of performance parameters such as air consumption, bearing oscillation and lift behavior in accordance with an applied force. Depending on the weighting of the individual performance parameters as a function of the respective use, for example for different load scenarios, the air bearing types can be advantageous or disadvantageous. As a result, in different load scenarios when using an air bearing type, there may be insufficient stiffness or even failure of the air bearing.

SUMMARY

It is therefore an object of the present invention to provide an air bearing and a coordinate measuring machine which avoid the disadvantages of known systems. In particular, a stiffness adapted to the load scenario is to be permitted.

This object is achieved by a linear guide and a coordinate measuring machine as disclosed herein. Advantageous refinements, which may be realized individually or in combination, are described below.

Hereinafter the terms "exhibit," "have," "comprise," or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B," "A has B," "A comprises B," or "A includes B" may refer both to the situation in which no further element aside from B is provided in A (that is to say to a situation in which A is composed exclusively of B) and to the situation in which, in addition to B, one or more further elements are provided in A, for example element C, elements C and D, or even further elements.

Furthermore, the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably," "in particular," "by way of example," or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by the person skilled in the art, can also be carried out using other configurations. Similarly, features introduced by "in one embodiment of the invention" or "in one exemplary embodiment of the invention" are to be understood to be optional features, without this being intended to restrict alternative refinements or the scope of protection of the independent claims. Furthermore, all possibilities of combining the features introduced by these introductory expressions with other features, whether optional or non-optional features, are intended to remain unaffected by the introductory expressions.

According to a first aspect of the present invention, an air bearing is provided for movably bearing at least two elements. An air bearing can be understood as a guide element which is in principle of any desired shape and which is configured to move the first element, for example a component of a coordinate measuring machine, in particular a gantry and/or a column of a gantry of the coordinate measuring machine, relative to a second element, for example a second component of the coordinate measuring machine, for example a plate-shaped base body, by air, in particular compressed air. An air gap can be arranged between the first element and the second element. For example, the first element can lie on the air bearing, and an air gap can be arranged between the air bearing and the second element.

The air bearing may in principle be used in a variety of devices in the field of mechanical engineering, for example in machine tools, milling machines, or coordinate measuring machines. In the context of the present invention, the air bearing will be described in conjunction with a coordinate measuring machine. Other fields of use are however also conceivable.

The air bearing comprises at least one bearing main body with at least one first air outflow channel and at least one second air outflow channel. The first air outflow channel can be supplied with air via at least one first air delivery device. The second air outflow channel can be supplied with air via at least one second air delivery device.

A bearing main body can be understood generally as a bearing main body which is of any desired shape and on which and in which further components of the air bearing are arranged. The bearing main body can have a geometry chosen from: a rectangular geometry, a square geometry, or a circular geometry. However, further shapes are also conceivable. An air outflow channel can be understood as a flow channel which is configured to permit air to flow into the bearing main body and to flow out of the bearing main body. The first and/or second air outflow channel can be designed as at least one groove and/or bore in the bearing main body. The first and/or second air outflow channel can be designed as a groove extending around a surface of the bearing main body, in particular a surface directed towards the second element. The air bearing can have a plurality of air outflow channels, for example two, three, four or more air outflow channels. The expressions "first" and "second" air outflow channel are merely designations and do not provide any information regarding a sequence and regarding whether the bearing main body has further air outflow channels.

A geometry and arrangement of the first air outflow channel and/or second air outflow channel can be adapted to a geometry of the bearing main body. The air outflow channels can have a geometry chosen from: a rectangular geometry, a square geometry, or a circular geometry. However, further shapes are also conceivable. The first air outflow channel and the second air outflow channel can be designed as a groove extending around a surface of the air bearing body. The first air outflow channel can be arranged in at least a first region of the bearing main body, and the second air outflow channel can be arranged in at least a second region of the bearing main body. The second air outflow channel can be arranged radially around the first air outflow channel. The first air outflow channel can be arranged in a central region of the bearing main body. The second air outflow channel can be arranged in an outer region of the bearing main body. An air outflow channel chosen from the first air outflow channel and the second air outflow channel can have an air outflow channel lying inwardly in the surface of the bearing main body relative to the other air flow channel, and the other air outflow channel can have an air outflow channel lying outward in the surface of the bearing main body relative to the other air flow channel. Other configurations are also conceivable, however.

The first air outflow channel and the second air outflow channel can be configured to be fluidically separate from each other. The expression "fluidically separate" can be understood to mean that air from the first air outflow channel cannot flow into the second air outflow channel and that air from the second air outflow channel cannot flow into the first air outflow channel. The first air outflow channel and the second air outflow channel can be configured to be separate from each other and cannot communicate with each other.

An "air delivery device" can be understood as a device which is configured to supply air to one of the air outflow channels. The expression "can be supplied with air" can be understood as the delivery and/or provision of air, in particular by pressure. The air bearing can have at least one air delivery bore. The first air outflow channel and/or the second air outflow channel can be supplied with air via the air delivery bore. For example, the air bearing can have an air delivery bore for each of the air outflow channels, and the air outlet channels are supplied with air separately. Alternatively, the air bearing can have a common air delivery bore for several of the air outflow channels. The common air delivery bore can be configured in such a way that the first air outflow channel and the second air outflow channel are supplied with air substantially simultaneously. "Substantially simultaneously" can be understood as a simultaneous supply, wherein deviations from a simultaneous supply are possible through an arrangement of the air outflow channels.

The air delivery device can have at least one air attachment which is configured to connect the air outflow channels to an air supply, in particular a separate air supply. The air attachment can have an interface into which at least one delivery line can be incorporated.

The first air outflow channel and the second air outflow channel can be supplied with air separately from each other. The air bearing can be configured to supply the first air outflow channel and the second air outflow channel with air independently of each other. The air bearing can be configured to supply the first air outflow channel and the second air out-flow channel with air at a different pressure. For example, the air bearing can be configured such that at least one air outflow channel chosen from the first air outflow channel and the second air outflow channel can be supplied with a higher or lower air pressure than the other air outflow channel. The air bearing can be designed as an air bearing with variable air delivery. The air bearing can be configured to switch on and/or switch off a delivery of air to the first air outflow channel and/or the second air outflow channel. The air bearing can have at least one valve for controlling the supply of air to the first air outflow channel and/or the second air outflow channel. The valve can be configured to switch in the millisecond range. The valve can be arranged upstream from the air attachment in a direction of flow of the air. The valve can typically be arranged as close as possible to the air attachment to keep idle times to a minimum.

Exemplary embodiments are also conceivable in which a vacuum can be applied to at least one air outflow channel chosen from the first air outflow channel and the second air outflow channel. For example, at least one air outflow channel chosen from the first air outflow channel and the second air outflow channel can be configured to draw in air, in particular ambient air, by suction and/or aspiration. The air bearing can be used as a suction bearing, for example.

The air bearing can have at least one controller which is configured to adjust the supply of air to the first air outflow channel and/or the second air outflow channel. A "controller" can be understood generally as an electronic device which is configured to adjust the supply of air to the first air outflow channel and/or the second air outflow channel. The expression "to adjust the supply" can be understood as an adaptation of a volumetric flow, in particular to a load scenario, and/or the switching on and/or off of the air delivery of the first air outflow channel and/or of the second air outflow channel, in particular a control of the valve.

The air bearing can have at least one sensor, which is configured to detect a bearing stroke and/or a bearing pressure and/or a bearing throughflow. The controller can be configured to adjust the supply of air to the first air outflow channel and/or the second air outflow channel according to the detected bearing stroke and/or bearing pressure and/or bearing throughflow. The controller can be designed in accordance with the controller of United States Patent Application Publication No. 2018/0066704. For example, one or more electronic connections can be provided between the sensor and the controller. The controller can comprise, for example, at least one data processing device, for example at least one computer or microcontroller. The data processing device can have one or more volatile and/or non-volatile data memories, wherein the data processing device can for example be set up, in terms of programming technology, to actuate the sensor. The controller can furthermore comprise at least one interface, for example an electronic interface and/or a human-machine interface, for example an input/output device such as a display and/or a keyboard. The controller can be constructed for example centrally or in a decentralized manner. Other configurations are also conceivable.

The variable supply of air to the first air outflow channel and/or the second air outflow channel can facilitate an adaptation of the stiffness of the air bearing to the specific requirements. For example, in the case of a small load, it is possible for only the air outflow channel in the central region to be supplied with air. In the case of a greater load, the air outflow channel in the outer region can alternatively or additionally be switched on. At a constant stroke, the supporting force of the bearing can be increased by switching on at least one of the air outflow channels, in particular by switching on an air outflow channel arranged in the outer region of the air bearing.

The controller can be configured to switch on and/or switch off the air supply to the first air outflow channel and/or the second air outflow channel intermittently, in particular for a predefinable or predefined period of time. During a traversing operation of the elements, for example of the coordinate measuring machine, relative to each other, a maximum stiffness of the bearing is mostly not needed at constant speeds. At constant speeds, the controller can be configured to supply air to only one air outflow channel chosen from the first air outflow channel and the second air outflow channel. During the traversing operation of the elements relative to each other, additional loads causing jolting movements may arise during acceleration and deceleration processes. Here, a further load resulting from a positive or negative acceleration may add to a static load that is to be supported. The controller can be configured to switch on the air supply to the air outflow channel in the outer region during acceleration and deceleration processes. Thus, a bearing force can be increased for a predefinable or predefined period of time and settling of the air bearing can be prevented.

The air bearing can moreover have at least one pressure accumulator. The pressure accumulator can be configured to make available a continuous air stream with low pressure fluctuations.

The air bearing can have at least one throttle device. A throttle device can be understood as a component which is configured to regulate, in particular reduce, volumetric flow from the first air outflow channel and/or the second air outflow channel. The throttle device can have at least one plate made of porous material, for example comprising a sintered ceramic, brass, graphite; or at least one bored plate. The bored plate can have a plurality of throttle bores. The throttle bores can be arranged in such a way that air can flow from the air outflow channels. The throttle device can be secured on the bearing main body, for example with at least one form-fit connection and/or force-fit connection and/or cohesive connection. For example, the throttle device can be fixed to the bearing main body via an adhesive connection and/or a solder connection and/or a snap-fit connection and/or a screw connection. The throttle device can have a large number of plates and/or bored plates. For example, the throttle device can have a first plate and/or first bored plate, which is configured to regulate a volumetric flow from the first air outflow channel. The throttle device can have a second plate and/or second bored plate, which is configured to regulate a volumetric flow from the second air outflow channel. Other configurations with further plates and/or bored plates are also conceivable, for example with three, four, five or more plates and/or bored plates.

According to a further aspect of the present invention, a coordinate measuring machine comprising at least one air bearing is provided. The air bearing comprises at least one bearing main body with at least one first air outflow channel and at least one second air outflow channel. The first air outflow channel can be supplied with air via at least one first air delivery device. The second air outflow channel can be supplied with air via at least one second air delivery device.

The air bearing can be designed in accordance with one of the exemplary embodiments described above. For details and definitions with regard to the coordinate measuring machine, reference is made to the description of the air bearing.

The coordinate measuring machine can be a gantry-type measuring machine or a bridge-type measuring machine. The coordinate measuring machine can have a measuring table on which to place a workpiece. The coordinate measuring machine can have at least one gantry which has at least one first vertical column, at least one second vertical column, and a cross beam which connects the first vertical column and the second vertical column. At least one vertical column chosen from the first and second vertical columns can be mounted on the measuring table so as to be movable in a horizontal direction by the air bearing. The horizontal direction can be a direction along a y-axis. The coordinate measuring machine can have a coordinate system, for example a Cartesian coordinate system or a spherical coordinate system. Other coordinate systems are also conceivable. An origin or zero point of the coordinate system can be defined for example by a sensor of the coordinate measuring machine. For example, a plurality of air bearings can be arranged horizontally along the y-axis and be designed to move the gantry and/or the at least one column of the gantry linearly along the y-axis. An x axis can run perpendicular to the y axis in a plane of the supporting surface of the measuring table. A z-axis can extend perpendicular to the plane of the supporting surface, in a vertical direction. The vertical columns can extend along the z-axis. The cross beam can extend along the x-axis.

The coordinate measuring machine can have at least one measuring slide which is mounted to be movable along the cross beam. A measuring slide can be generally understood to mean a slide which is configured to accommodate at least one sensor device directly or via further components. In the measuring slide there may be mounted a quill which is movable in a vertical direction, for example along the z-axis. On a lower end of the quill, in particular an end pointing in the direction of the supporting surface, a sensor may be arranged, for example a tactile sensor, by which a surface of the workpiece can be probed. Here, in the context of the present invention, a workpiece can be understood generally to mean an arbitrarily shaped object to be measured.

The movement of the elements of the coordinate measuring machine can be operated and/or set and/or adjusted manually and/or automatically. The coordinate measuring machine can have at least one drive, for example at least one motor. The coordinate measuring machine can have a control unit which is designed to actuate the air bearing and move the elements along the horizontal direction. The control unit can furthermore comprise at least one interface, for example an electronic interface and/or a human-machine interface, for example an input/output device such as a display and/or a keyboard and/or an operating console.

The coordinate measuring machine can be configured to probe the workpiece, in particular a surface of the workpiece, by the sensor through movement of the gantry and/or of the measuring slide and/or of the quill in all three spatial directions. The sensor device can for example comprise at least one probe head, such as at least one probe sphere. The sensor device can be configured to generate at least one signal, for example an electronic signal. The coordinate measuring machine can furthermore have at least one evaluation unit which is configured to evaluate the signal generated by the sensor and to generate, from the signal, at least one item of information regarding a measurement point on the surface of the workpiece.

According to a further aspect of the invention, a method for operating an air bearing is provided. The method comprises the following steps:

supplying air to at least one first air outflow channel of the air bearing via at least one first air delivery device; and supplying air to at least one second air outflow channel of the air bearing via at least one second air delivery device.

The method steps can be carried out in the sequence indicated. Another sequence is also possible in principle. Moreover, one or more or all of the method steps can also be repeated. Moreover, two or more of the method steps can also be carried out with a complete or partial time overlap or can be carried out simultaneously. In addition to the stated method steps, the method can also comprise further method steps.

The method can have a measurement step, wherein a bearing stroke and/or a bearing pressure and/or a bearing throughflow are detected. The first air outflow channel and/or the second air outflow channel can be supplied with air according to the detected bearing stroke and/or bearing pressure and/or bearing throughflow.

An air bearing according to one of the exemplary embodiments described above can be used in the method. For details and definitions with regard to the coordinate measuring machine, reference is made to the description of the air bearing.

In summary, in the context of the present invention, the following exemplary embodiments are provided:

Exemplary Embodiment 1

Air bearing for movably bearing at least two elements, wherein the air bearing comprises at least one bearing main body with at least one first air outflow channel and at least one second air outflow channel, wherein the first air outflow channel can be supplied with air via at least one first air delivery device, wherein the second air outflow channel can be supplied with air via at least one second air delivery device.

Exemplary Embodiment 2

Air bearing according to the preceding exemplary embodiment, wherein the first air outflow channel and the second air outflow channel are designed to be fluidically separate from each other.

Exemplary Embodiment 3

Air bearing according to the preceding exemplary embodiment, wherein the first air outflow channel and the second air outflow channel can be supplied with air separately from each other.

Exemplary Embodiment 4

Air bearing according to one of the preceding exemplary embodiments, wherein the air bearing has at least one air delivery bore, wherein the first air outflow channel and/or the second air outflow channel can be supplied with air via the air delivery bore.

Exemplary Embodiment 5

Air bearing according to one of the preceding exemplary embodiments, wherein the air bearing has a plurality of air outflow channels.

Exemplary Embodiment 6

Air bearing according to one of the preceding exemplary embodiments, wherein the first air outflow channel is arranged in at least a first region of the bearing main body, and the second air outflow channel is arranged in at least a second region of the bearing main body.

Exemplary Embodiment 7

Air bearing according to one of the preceding exemplary embodiments, wherein the first air outflow channel is arranged in a central region of the bearing main body, and wherein the second air outflow channel is arranged in an outer region of the bearing main body.

Exemplary Embodiment 8

Air bearing according to one of the preceding exemplary embodiments, wherein the air bearing has at least one throttle device, wherein the throttle device has at least one plate made of porous material, for example comprising a sintered ceramic, brass, graphite; or at least one bored plate.

Exemplary Embodiment 9

Air bearing according to the preceding exemplary embodiment, wherein the bored plate has a plurality of throttle bores, wherein the throttle bores are arranged in such a way that air can flow from the air outlet channels.

Exemplary Embodiment 10

Air bearing according to one of the preceding two exemplary embodiments, wherein the throttle device is secured on the bearing main body.

Exemplary Embodiment 11

Air bearing according to one of the preceding exemplary embodiments, wherein the bearing main body has a geometry chosen from: a rectangular geometry, a square geometry, or a circular geometry, wherein the air outflow channels have a geometry chosen from: a rectangular geometry, a square geometry, or a circular geometry.

Exemplary Embodiment 12

Air bearing according to one of the preceding exemplary embodiments, wherein the air bearing has at least one valve for controlling the supply of air to the first air outflow channel and/or the second air outflow channel.

Exemplary Embodiment 13

Air bearing according to one of the preceding exemplary embodiments, wherein the air bearing has at least one pressure accumulator.

Exemplary Embodiment 14

Air bearing according to one of the preceding exemplary embodiments, wherein the air bearing has at least one controller which is configured to adjust the supply of air to the first air outflow channel and/or the second air outflow channel.

Exemplary Embodiment 15

Air bearing according to the preceding exemplary embodiment, wherein the air bearing has at least one sensor which is configured to detect a bearing stroke and/or a bearing pressure and/or a bearing throughflow, wherein the controller is configured to adjust the supply of air to the first air outflow channel and/or the second air outflow channel according to the detected bearing stroke and/or bearing pressure and/or bearing throughflow.

Exemplary Embodiment 16

Coordinate measuring machine comprising at least one air bearing, wherein the air bearing comprises at least one bearing main body with at least one first air out-flow channel and at least one second air outflow channel, wherein the first air outflow channel can be supplied with air via at least one first air delivery device, wherein the second air outflow channel can be supplied with air via at least one second air delivery device.

Exemplary Embodiment 17

Coordinate measuring machine according to the preceding exemplary embodiment, wherein the air bearing is configured according to one of the preceding exemplary embodiments relating to an air bearing.

Exemplary Embodiment 18

Coordinate measuring machine according to one of the preceding exemplary embodiments relating to a coordinate measuring machine, wherein the coordinate measuring machine is a gantry-type measuring machine or a bridge-type measuring machine.

Exemplary Embodiment 19

Coordinate measuring machine according to one of the preceding exemplary embodiments relating to a coordinate measuring machine, wherein the coordinate measuring machine has at least one carrier device and at least one measuring system, wherein the measuring system and/or the carrier device are mounted movably by the air bearing.

Exemplary Embodiment 20

Method for operating an air bearing, wherein the method comprises the following steps:
supplying air to at least one first air outflow channel of the air bearing via at least one first air delivery device; and
supplying air to at least one second air outflow channel of the air bearing via at least one second air delivery device.

Exemplary Embodiment 21

Method according to the preceding exemplary embodiment, wherein the method has a measurement step, wherein a bearing stroke and/or a bearing pressure and/or a bearing throughflow are detected in the measurement step, wherein the first air outflow channel and/or the second air outflow channel are supplied with air according to the detected bearing stroke and/or bearing pressure and/or bearing throughflow.

Exemplary Embodiment 22

Method according to the preceding exemplary embodiment, wherein an air bearing according to one of the preceding exemplary embodiments relating to an air bearing is used.

BRIEF DESCRIPTION OF THE DRAWINGS

The invention will now be described with reference to the drawings wherein.

DESCRIPTION OF EXEMPLARY EMBODIMENTS

Figure 1:
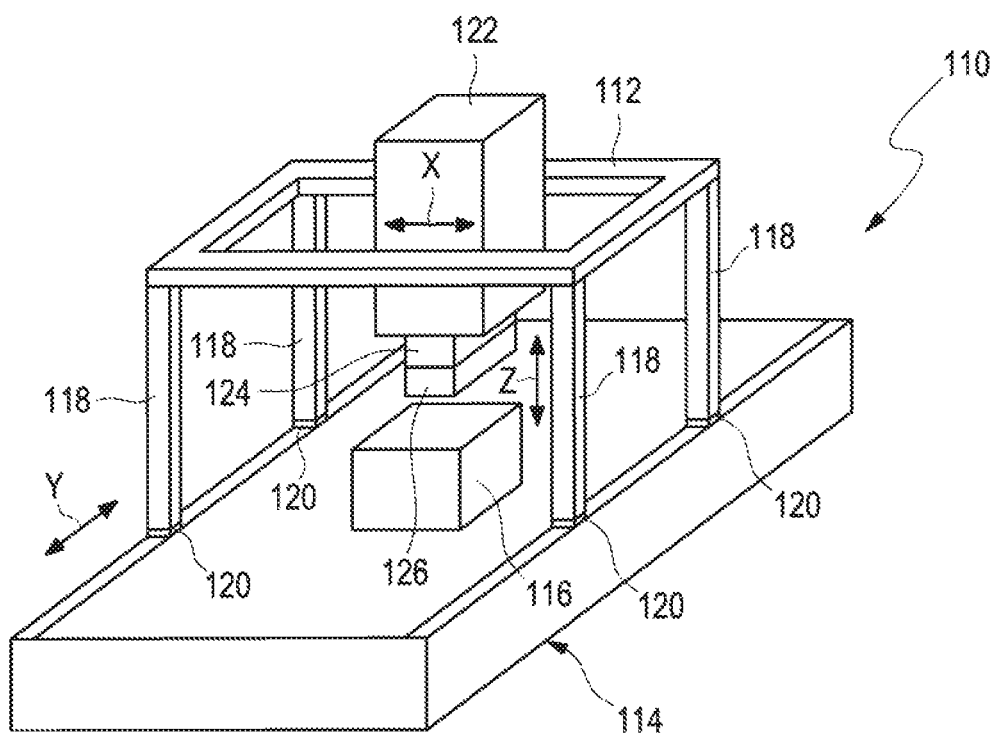
FIG. 1 shows a schematic illustration of an exemplary embodiment of a coordinate measuring machine.

Further details and features of the invention will become apparent from the following description of exemplary embodiments. The respective features can be realized by themselves or as a plurality in combination with one another. The invention is not restricted to the exemplary embodiments. The exemplary embodiments are illustrated schematically in the figures. Identical reference numerals in the individual figures designate identical or functionally identical elements or elements corresponding to one another with regard to their functions.

FIG. 1 shows a schematic illustration of an exemplary embodiment of a coordinate measuring machine 110. The coordinate measuring machine 110 can be configured as a gantry-type measuring machine. The coordinate measuring machine can have a carrier device, in particular a gantry carrier 112. The coordinate measuring machine can have a measuring table 114 on which to place a workpiece 116. The gantry carrier 112 can be arranged on vertical columns 118. The coordinate measuring machine 110 has at least one air bearing 120. The carrier device can be mounted movably in a horizontal direction by the air bearing 120. The columns 118 can be supported by the air bearing 120 and can be arranged on the measuring table 114 in such a way as to be movable in the horizontal direction. The horizontal direction can be a direction along a y-axis. The coordinate measuring machine 110 can have a coordinate system, for example a Cartesian coordinate system or a spherical coordinate system. Other coordinate systems are also conceivable. An origin or zero point of the coordinate system can be defined for example by a sensor device 126 of the coordinate measuring machine 110. For example, a plurality of air bearings 120 can be arranged horizontally along the y-axis and be configured to move the gantry and/or the at least one column 118 of the gantry linearly along the y axis. An x-axis can run perpendicular to the y-axis in a plane of the measuring table 114. A z-axis can extend perpendicular to the plane of the supporting surface, in a vertical direction. The vertical columns 118 can extend along the z-axis. A cross beam can extend along the x-axis.

The coordinate measuring machine 110 can have at least one measuring system which is mounted to be movable by the air bearing 120. The at least one measuring system can have at least one measuring slide 122 which is mounted to be movable along the cross beam. In the measuring slide 122, a receptacle 124 may be mounted which is movable in a vertical direction, for example along the z-axis. On a lower end of the receptacle 124, in particular on an end pointing in the direction of the measuring table 114, a sensor device 126 may be arranged, for example a tactile sensor, by which a surface of the workpiece 116 can be probed. The receptacle 124 can be arranged to be supportable and movable by the air bearing 120.

The movement of the movable elements of the coordinate measuring machine 110, in particular of the receptacle 124 and of the vertical columns 118, can be operated and/or set and/or adjusted manually and/or automatically. The coordinate measuring machine 110 can have at least one drive, for example at least one motor. The coordinate measuring machine 110 can have a control unit which is designed to actuate the air bearing 120 and move the elements along the horizontal direction. The control unit can furthermore comprise at least one interface, for example an electronic interface and/or a human-machine interface, for example an input/output device such as a display and/or a keyboard and/or an operating console.

The coordinate measuring machine 110 can be configured to probe the workpiece 116, in particular a surface of the workpiece 116, by the sensor device 126 through movement of the gantry and/or of the measuring slide 122 and/or of the receptacle 124 in all three spatial directions. The sensor device 126 can for example comprise at least one probe head, such as at least one probe sphere. The sensor device 126 can be configured to generate at least one signal, for example an electronic signal. The coordinate measuring machine 110 can furthermore have at least one evaluation unit which is configured to evaluate the signal generated by the sensor device 126 and to generate, from the signal, at least one item of information regarding a measurement point on the surface of the workpiece 116.

Figure 2A:
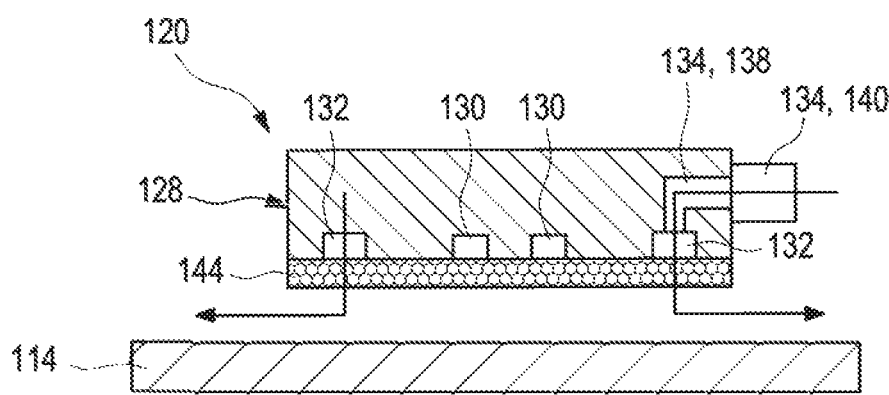
FIGS. 2A and 2B show a sectional illustration of an air bearing according to an exemplary embodiment of the invention.

FIG. 2A shows a sectional illustration of the air bearing 120. The air bearing 120 can be separated from a guide unit, for example a measuring table 114, by an air gap. The air bearing 120 comprises at least one bearing main body 128 with at least one first air outflow channel 130 and at least one second air outflow channel 132. The first air outflow channel 130 can be supplied with air via at least one first air delivery device 134. The second air outflow channel 132 can be supplied with air via at least one second air delivery device 136.

The first air outflow channel 130 can be arranged in at least a first region of the bearing main body 128, and the second air outflow channel 132 can be arranged in at least a second region of the bearing main body 128. The second air outflow channel 132 can be arranged radially around the first air outflow channel 130. The first air outflow channel 130 can be arranged in a central region of the bearing main body 128. The second air outflow channel 132 can be arranged in an outer region of the bearing main body. An air outflow channel chosen from the first air outflow channel 130 and the second air outflow channel 132 can have an air outflow channel lying inwardly in the surface of the bearing main body 128 relative to the other air flow channel, and the other air outflow channel can have an air outflow channel lying outward in the surface of the bearing main body relative to the other air flow channel.

The first air outflow channel 130 and the second air outflow channel 132 can be configured to be fluidically separate from each other. The first air outflow channel 130 and the second air outflow channel 132 can be configured to be separate from each other and cannot communicate with each other. The air bearing 120 can have at least one air delivery bore 138. The first air outflow channel 130 and/or the second air outflow channel 132 can be supplied with air via the air delivery bore 138. For example, the air bearing 120 can have an air delivery bore 138 for each of the air outflow channels, and the air outlet channels are supplied with air separately. Alternatively, the air bearing 120 can have a common air delivery bore 138 for several of the air outflow channels. The common air delivery bore 138 can be configured in such a way that the first air outflow channel 130 and the second air outflow channel 132 are supplied with air substantially at the same time. The first air delivery device 134 can have at least one first air attachment 140 which is configured to connect the first air outflow channel 130 to an air supply, in particular a separate air supply. The second air delivery device 136 can have at least one second air attachment 142 which is configured to connect the second air outflow channel 132 to an air supply, in particular a separate air supply. The air attachment 140, 142 can have an interface into which at least one delivery line can be incorporated.

The air bearing 120 can have at least one throttle device 144. The throttle device 144 can have at least one plate made of porous material, for example comprising a sintered ceramic, brass, graphite; or at least one bored plate. The bored plate can have a plurality of throttle bores. The throttle bores can be arranged in such a way that air can flow from the air outflow channels. The throttle device 144 can be secured on the bearing main body 128, for example with at least one form-fit connection and/or force-fit connection and/or cohesive connection. For example, the throttle device 144 can be fixed to the bearing main body 128 via an adhesive connection and/or a solder connection and/or a snap-fit connection and/or a screw connection.

Figure 2B:
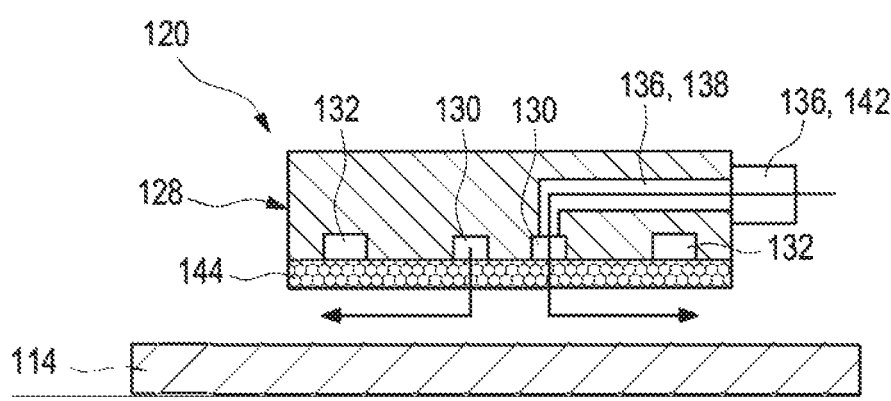

FIG. 2A shows the first air outflow channel 130 supplied with air, wherein the air flow direction is indicated by arrows. FIG. 2B shows the second air outflow channel 132 supplied with air. The air flow direction is likewise indicated by arrows.

Figure 3A:
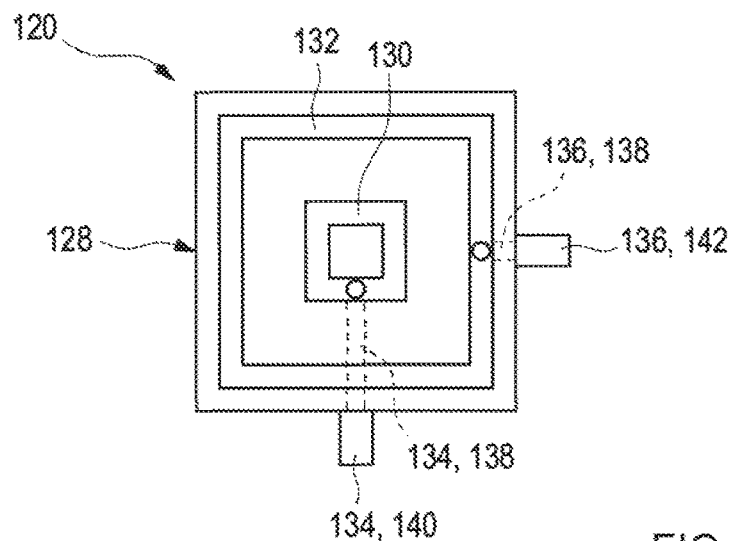
FIGS. 3A and 3B show a schematic illustration of two exemplary embodiments of the air bearing.
Figure 3B:
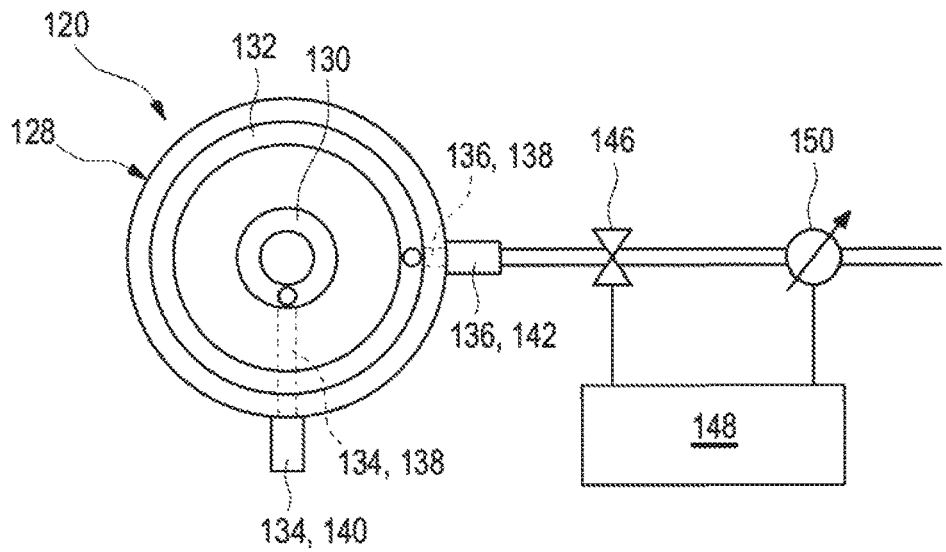

FIGS. 3A and 3B show schematic illustrations of two exemplary embodiments of the air bearing 120. As is shown in FIGS. 3A and 3B, the first air outflow channel 130 and the second air outflow channel 132 can be supplied with air separately from each other. The air bearing 120 can be configured to supply air to the first air outflow channel 130 and the second air outflow channel 132 independently of each other. The air bearing 120 can be configured as an air bearing with variable air delivery. The air bearing 120 can be configured to switch on and/or switch off a delivery of air to the first air outflow channel 130 and/or the second air outflow channel 132. As is shown by way of example for the air outflow channel 132 in FIG. 3B, the air bearing 120 can have at least one valve 146 for controlling the supply of air to the first air outflow channel 130 and/or the second air out-flow channel 132. The valve 146 can be configured to switch in the millisecond range. The valve 146 can be arranged upstream from the air attachment 140, 142 in a direction of flow of the air. The valve 146 can typically be arranged as close as possible to the air attachment 140, 142 to keep idle times to a minimum.

The air bearing 120 can have at least one controller 148 which is configured to adjust the supply of air to the first air outflow channel 130 and/or the second air outflow channel 132. The air bearing 120 can have at least one sensor 150, which is configured to detect a bearing stroke and/or a bearing pressure and/or a bearing throughflow. As is shown in FIG. 3B, the sensor 150 can be configured as a through-flow meter. The controller 148 can be configured to adjust the supply of air to the first air outflow channel 130 and/or the second air outflow channel 132 according to the detected bearing stroke and/or bearing pressure and/or bearing throughflow. The controller 148 can be configured in accordance with the controller of United States Patent Application Publication 2018/0066704. The controller 148 can be configured to switch the valve 146. For example, one or more electronic connections can be provided between the sensor 150 and the controller 148 and between the valve 146 and the controller 148. The controller 148 can comprise, for example, at least one data processing device, for example at least one computer or microcontroller. The data processing device can have one or more volatile and/or non-volatile data memories, wherein the data processing device can for example be set up, in terms of programming technology, to actuate the sensor. The controller 148 can furthermore comprise at least one interface, for example an electronic interface and/or a human-machine interface, for example an input/output device such as a display and/or a keyboard. The controller 148 can be constructed for example centrally or in a decentralized manner. Other configurations are also conceivable.

The variable supply of air to the first air outflow channel 130 and/or the second air outflow channel 132 can facilitate an adaptation of the stiffness of the air bearing 120 to the specific requirements. For example, in the case of a small load, it is possible for only the first air outflow channel 132 in the central region to be supplied with air. In the case of a greater load, the second air outflow channel 132 in the outer region can alternatively or additionally be switched on. At a constant stroke, the supporting force of the air bearing 120 can be increased by switching on at least one of the air outflow channels, in particular by switching on an air outflow channel arranged in the outer region of the air bearing 120.

The controller 148 can be configured to switch on and/or switch off the supply of air to the first air outflow channel 130 and/or the second air outflow channel 132 intermittently, in particular for a predefinable or predefined period of time. During a traversing operation of the elements, for example of the coordinate measuring machine, relative to each other, a maximum stiffness of the bearing is mostly not needed at constant speeds. At constant speeds, the controller 148 can be configured to supply air only to one air outflow channel chosen from the first air outflow channel 130 and the second air outflow channel 132. During the traversing operation of the elements relative to each other, additional loads causing jolting movements may arise during acceleration and deceleration processes. Here, a further load resulting from a positive or negative acceleration may add to a static load that is to be supported. The controller 148 can be configured to switch on the supply of air to the second air outflow channel 132 in the outer region during acceleration and deceleration processes. Thus, a bearing force can be increased for a predefinable or predefined period of time and settling of the air bearing 120 can be prevented.

The bearing main body 128 can have a geometry chosen from: a rectangular geometry, a square geometry, or a circular geometry. FIG. 3A shows an exemplary embodiment with a square bearing main body 128. FIG. 3B shows an exemplary embodiment with a circular bearing main body 128. The first air outflow channel 130 and/or the second air outflow channel 132 can be configured as at least one groove and/or bore in the bearing main body 128. The first air out-flow channel 130 and/or the second air outflow channel 132 can be configured as a groove extending around a surface of the bearing main body 128, in particular a surface directed towards the second element. The air bearing 120 can have a plurality of air outflow channels, for example two, three, four or more air outflow channels. FIGS. 2A to 3B show exemplary embodiments with two air outflow channels. A geometry and arrangement of the first air outflow channel 130 and/or second air outflow channel 132 can be adapted to a geometry of the bearing main body 128. FIG. 3A shows an exemplary embodiment with square air outflow channels, and FIG. 3B shows an exemplary embodiment with circular air outflow channels.

Figure 4A:
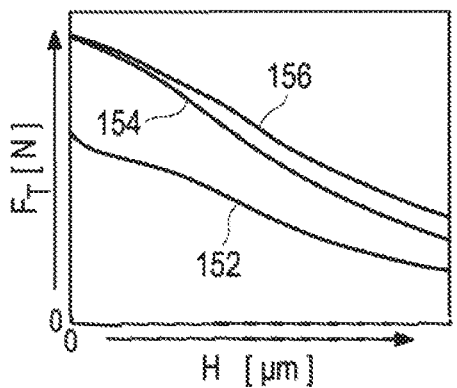
FIGS. 4A and 4B illustrate the bearing stroke as a function of the carrying force and the volumetric flow.
Figure 4B:
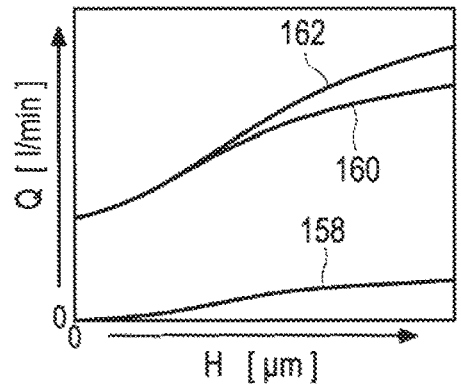

FIG. 4A shows an illustration of the bearing stroke H in μm as a function of the supporting force FT in N for air supply to the first air outflow channel 130 in the central region of the bearing main body 128 (reference sign 152), for air supply to the second air outflow channel 132 in the outer region of the bearing main body 128 (reference sign 154), and for supply to both air outflow channels (reference sign 156). FIG. 4B shows an illustration of the bearing stroke H in μm as a function of the volumetric flow Q in l/min for air supply to the first air outflow channel 130 in the central region of the bearing main body 128 (reference sign 158), for air supply to the second air outflow channel 132 in the outer region of the bearing main body 128 (reference sign 160), and for air supply to both air outflow channels (reference sign 162). FIGS. 4A and 4B show that, at a constant stroke, the supporting force of the air bearing 120 can be considerably increased by supplying air to the second, outer air outflow channel 132. At substantial strokes, the supporting force can be further increased by simultaneous use of both air outflow channels. At the same time, the air consumption increases on account of an increasing outlet surface area.

It is understood that the foregoing description is that of the exemplary embodiments of the invention and that various changes and modifications may be made thereto without departing from the spirit and scope of the invention as defined in the appended claims.

LIST OF REFERENCE SIGNS

110 Coordinate measuring machine
112 Gantry support
114 Measuring table
116 Workpiece
118 Vertical column
120 Air bearing
122 Measuring slide
124 Receptacle
126 Sensor device
128 Bearing main body
130 First air outflow channel 132 Second air outflow channel
134 First air delivery device
136 Second air delivery device
138 Air delivery bore
140 First air attachment
142 Second air attachment
144 Throttle device
146 Valve
148 Controller
150 Sensor
152 Curve
154 Curve
156 Curve
158 Curve
160 Curve
162 Curve

What is claimed is:

1. An air bearing for movably bearing at least two elements with an air gap therebetween, the air bearing comprising:
a first air delivery device;
a second air delivery device; and
a bearing main body having a first air outflow channel and a second air outflow channel each being configured to discharge air to an atmosphere through the air gap, the first air outflow channel being supplied with air via the first air delivery device, the second air outflow channel being supplied with the air via the second air delivery device, and the first and second air outflow channels extending on a planar surface of the bearing main body.

2. The air bearing of claim 1, wherein the first air outflow channel and the second air outflow channel are configured to be fluidically separate from each other.

3. The air bearing of claim 1, wherein the first air outflow channel and the second air outflow channel are supplied with the air separately from each other.

4. The air bearing of claim 1, further comprising:
at least one air delivery bore, wherein at least one of the first air outflow channel and the second air outflow channel are supplied with the air via the at least one air delivery bore.

5. The air bearing of claim 1, wherein the first air outflow channel is arranged in a first region of the bearing main body, and the second air outflow channel is arranged in a second region of the bearing main body.

6. The air bearing of claim 1, further comprising at least one valve configured to control a supply of air to at least one of the first air outflow channel and the second air outflow channel.

7. The air bearing of claim 1, further comprising at least one controller configured to adjust the supply of the air to at least one of the first air outflow channel and the second air outflow channel.

8. The air bearing claim 7, further comprising:
at least one sensor configured to detect at least one of a bearing stroke, a bearing pressure, and a bearing throughflow, and
wherein the at least one controller is configured to adjust the supply of the air to at least one of the first air outflow channel and the second air outflow channel in accordance with the at least one of the bearing stroke, the bearing pressure, and the bearing throughflow.

9. The air bearing of claim 1, wherein:
the first and second air outflow channels have at least one of a rectangular shape, a square shape, or a circular shape, and
the first and second air outflow channels are concentric.

10. A coordinate measuring apparatus comprising:
at least one air bearing for movably bearing at least two elements with an air gap therebetween, the air bearing including:
a first air delivery device;
a second air delivery device; and
a bearing main body having a first air outflow channel and a second air outflow channel each being configured to discharge air to an atmosphere through the air gap, the first air outflow channel being supplied with air via the first air delivery device, the second air outflow channel being supplied with the air via the second air delivery device, and the first and second air outflow channels extending on a planar surface of the bearing main body.

11. The coordinate measuring apparatus of claim 10, wherein the air bearing further includes:
at least one air delivery bore, wherein at least one of the first air outflow channel and the second air outflow channel are supplied with the air via the at least one air delivery bore.

12. The coordinate measuring apparatus of claim 10, wherein the air bearing further includes:
at least one sensor configured to detect at least one of a bearing stroke, a bearing pressure, and a bearing throughflow, and
at least one controller configured to adjust the supply of the air to at least one of the first air outflow channel and the second air outflow channel in accordance with the at least one of the bearing stroke, the bearing pressure, and the bearing throughflow.

13. The coordinate measuring apparatus of claim 10, further comprising a carrier device and a measuring system movably mounted by the air bearing.

14. A method for operating an air bearing for movably bearing at least two elements with an air gap therebetween, the method comprising:
providing a first air outflow channel and a second air outflow channel each being configured to discharge air to an atmosphere through the air gap, the first and second air outflow channels extending on a planar surface of a bearing main body;
supplying air to the first air outflow channel of the air bearing via a first air delivery device; and
supplying the air to the second air outflow channel of the air bearing via a second air delivery device.

15. The method of claim 14, further comprising:
detecting at least one of a bearing stroke, a bearing pressure, and a bearing throughflow; and
supplying at least one of the first air outflow channel and the second air outflow channel with the air according to the detected at least one of the bearing stroke, the bearing pressure, and the bearing throughflow.

16. The method of claim 14, wherein the first air outflow channel and the second air outflow channel are configured to be fluidically separate from each other.

17. The method of claim 14, wherein the first air outflow channel and the second air outflow channel are supplied with the air separately from each other.

18. The method of claim 14, wherein the air bearing further includes:
at least one air delivery bore, wherein at least one of the first air outflow channel and the second air outflow channel are supplied with the air via the at least one air delivery bore.

19. The method of claim 14, wherein the first air outflow channel is arranged in a first region of the bearing main body, and the second air outflow channel is arranged in a second region of the bearing main body.

20. The method of claim 14, wherein the air bearing further includes at least one valve configured to control a supply of air to at least one of the first air outflow channel and the second air outflow channel.

* * * * *